No. 747,214. PATENTED DEC. 15, 1903.
F. E. PARKER.
APPARATUS FOR SEPARATING AND CLEANING ORES.
APPLICATION FILED DEC. 1, 1902.
NO MODEL.
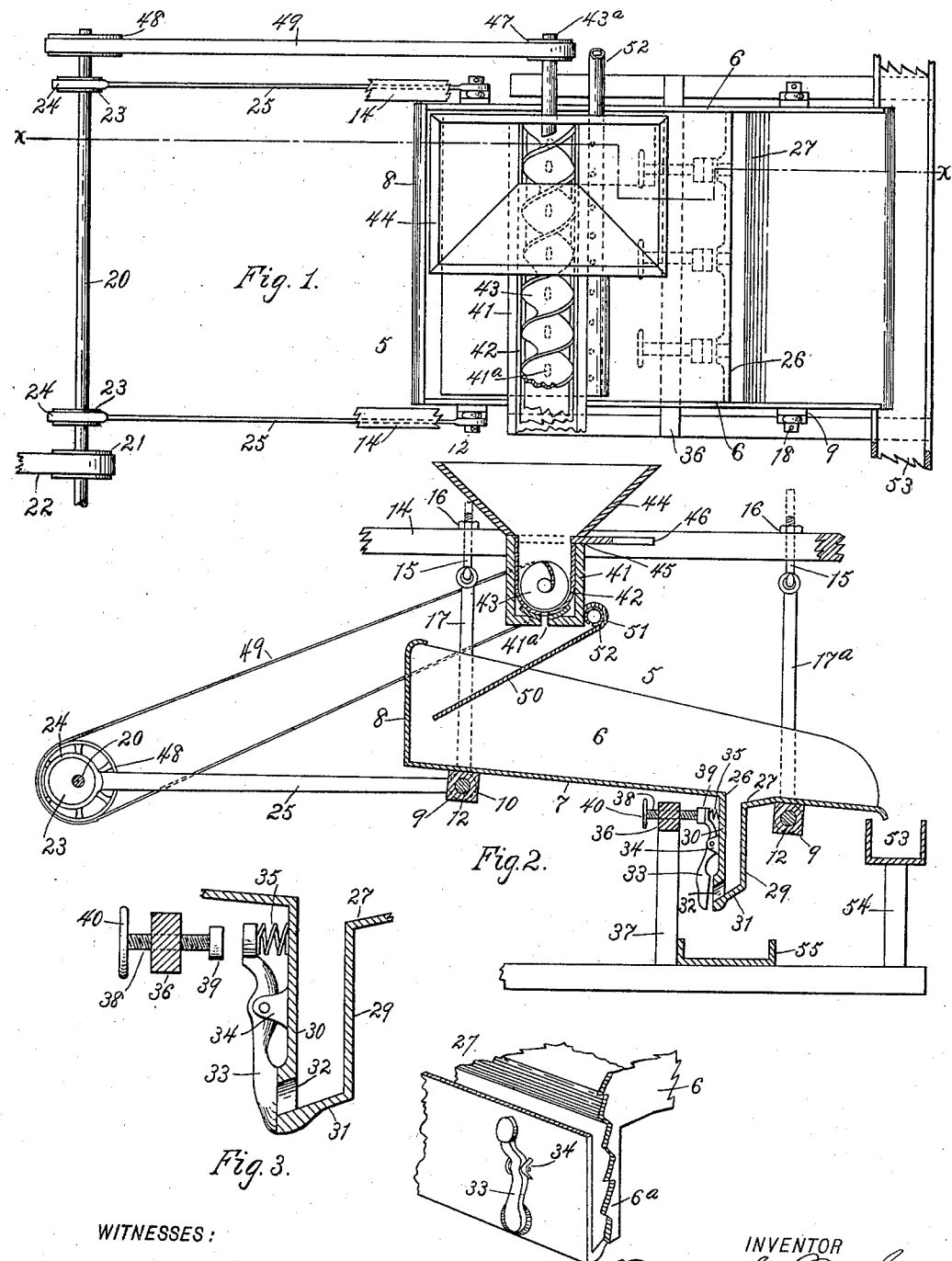
WITNESSES:
INVENTOR
Francis E. Parker
BY
Richd N. Manning
ATTORNEY No. 747,214. Patented December 15, 1903.

UNITED STATES PATENT OFFICE.

FRANCIS E. PARKER, OF KANSAS CITY, MISSOURI.

APPARATUS FOR SEPARATING AND CLEANING ORES.

SPECIFICATION forming part of Letters Patent No. 747,214, dated December 15, 1903.

Application filed December 1, 1902. Serial No. 133,492. (No model.)

*To all whom it may concern:*

Be it known that I, FRANCIS E. PARKER, a citizen of the United States of America, residing at Kansas City, in the county of Jackson and State of Missouri, have invented certain new and useful Improvements in Apparatus for Separating and Cleaning Ores; and I do hereby declare that the following is a full, clear, and exact description of the invention, such as will enable others to make and use the same, reference being had to the accompanying drawings, forming a part of this specification.

The objects of my invention are, first, to subject comminuted ores to a separation while agitated and gravitating toward the delivery end of the separator; second, to trap the metal separated from the ores into a valved pocket; third, to enable the metal separated from the ores to discharge itself from the pocket intermittently.

The invention consists in the novel construction and combination of parts, such as will be first fully described, and specifically pointed out in the claims.

In the drawings, Figure 1 is a plan view of the invention, the continuous ore-conveyers and the water-conducting pipe being shown broken away at one end. Fig. 2 is a vertical sectional view of the invention, taken on the line *x x* of Fig. 1, showing the pan at its limit of movement rearwardly and the valve in the pocket in an open position. Fig. 3 is an enlarged detail sectional view of the pocket on the reciprocating pan, showing the valve in a closed position. Fig. 4 is a broken view of the pocket, showing the end of the pocket and a broken portion of the side of the pan.

Similar numerals of reference indicate corresponding parts in all the figures of the drawings.

The ore to be separated in this invention is first reduced by milling or stamping processes to a granular condition of fineness, so as to be readily washed and the metal by its specific gravity to be trapped, and may be discharged in one direction while the lighter material passes off in an opposite direction.

The receptacle for the separation of the milled ore consists of a suspended reciprocating pan 5 of the requisite length and width, of which 6 6 represent the vertical sides, 7 the bottom, and 8 the rear end, the upper edge of which end is bent forward in the arc of a circle. The forward end of the pan is open. Upon the under surface of the bottom 7 of the pan and near the forward ends of the pan are secured fixedly the transverse blocks 9 9, which are rectangular in cross-section and perforated longitudinally at 10 and through which perforations extend the rods 12 12, the rods 12 at the rear end of the pan being slightly longer than that at the forward end. In order to support the pan 5 in an elevated position above the ground or floor of a building, I have shown the portions of horizontal ceiling-beams 14 14 parallel with and outside of the vertical planes of the sides 6 6 of the pan, which beams may also support the floor above and the milling-machine. Through these beams from the under side upwardly extend the eyebolts 15, the upper ends of which bolts are screw-threaded and upon which are the nuts 16. With the ends of the rods 12 12 at the upper end of the pan are connected the short vibrating bars or hangers 17 17, which are perforated at each end, the lower ends of which bars extend downwardly adjacent to the outer surface of the sides 6 6 of the pan and are fitted over the ends of the rods 12 and secured by a cotter 18. The upper perforated ends of the bars 17 are connected with the eyebolts 15. With the ends of the rod 12 at the forward end of the pan are the vibrating bars 17ª 17ª, which are slightly larger than the bars 17 17 and also perforated at each end and connected at their upper ends with eyebolts 15 15 in the same manner as said bars 17 17. The difference in the length of the bars affords a forward and downward inclination of the pan 5, the degree of inclination being lessened or increased by the adjustment of the nuts 16 on the eyebolts 15.

In rear of the pan 5 the proper distance and supported in any suitable manner above the floor approximately the height of the bottom of the pan 5 is a line-shaft 20, which extends in a direction transversely to the pan and upon which shaft is a pulley 21 and upon said pulley a belt 22, which extends over the driving-shaft of an engine. (Not shown.) Upon the shaft 20 are the eccentric-plates 23 23, upon which plates are the rings 24 24. With the rings 24 24 are connected one end of the eccentric-rods 25 25, the other ends of which rods are perforated and fitted over the ends of the rod 12 upon the outer side of the bars 17 17, the rods 25 being secured to the rod 12 by cotters 18.

In the bottom 7 of the pan at a point about one-third the distance rearwardly from the forward end of said pan is a transverse opening 26, which is narrow in width and extends from one side of the pan to the other. A portion of the bottom of the pan upon the side of the opening 26 toward the open or forward end of the pan is deflected or bent rearwardly and downwardly a short distance below the level of the bottom of the pan, as seen at 27. Beneath the opening 26 is the metal-holding pocket, which consists of the forward and rear plates 29 and 30, which are connected rigidly with the bottom 7 of the pan and in line with the respective opposite edges of the opening 26 and extend the full width of the bottom of the pan. The rear plate 30 extends downwardly a short distance below the horizontal line of the lower end of the front plate 29, and to said pocket is formed a bottom by means of a plate 31, which extends from the lower edge of plate 29 to the lower edge of plate 30 at an angle of inclination sufficient to cause the metal to gravitate toward plate 30. The ends of the pocket are formed by downward extensions 6$^a$ from the sides 6 of the pan, as seen in Fig. 4, and extending in width to form the outer surface of the plate 29 to the outer surface of the plate 30.

In the rear plate 30 and in line with the inclined inner surface of the bottom 31 of the pocket and near one end of the pocket is a valved discharge-opening 32.

33 is a valve upon the outer surface of the plate 30, which closes the opening 32. The valve consists of a lever bar or stem arranged in a vertical position and pivoted at a point nearly equidistant from its upper and lower ends to the lugs 34 at such a distance from the plate 30 as to be alternately moved at each end to and from the plate 30, the lower end closing the opening 32 and the upper end bearing upon a spring 35, placed between said end and the plate 30.

In order that the discharge of the metal may be controlled in quantity and the valve operated automatically a transverse bar 36 is arranged in position directly in rear of and parallel with plate 30 and so as to be horizontally in line with and yet removed from contact with the upper end of the valve 33. This bar 36 is supported at each end by the standards 37, extending upwardly from the floor or ground. Through the bar 36 extends a screw-threaded opening 37, and within said opening is a screw-threaded rod 38, upon the inner end of which rod is a block 39, which comes into contact with the upper end of the valve 33 intermittently and forms an adjustable abutment during the reciprocal movements of the pan 5. Upon the outer end of the rod 38 is a hand-wheel 40, by means of which wheel the distance between the abutment 39 and the valve is regulated.

I have shown a number of discharge-openings in the pocket, which are precisely the same as the one described and closed by valves working in like manner, so that the flow of the metal may not be limited.

The supply of the comminuted ores to the pan 5 is through the medium of a longitudinal conveyer-box 41, arranged in position directly above the rear end of the pan 5 and extending transversely thereto, within which is a lining 42, the bottom of the lining being curved in a single line from the sides of the box and raised a short distance above the bottom of said box. Within the box 41 is a worm conveyer 43 of the usual construction, and in the box 41 are perforations 41$^a$, extending through the lining 42, by means of which the comminuted ores are distributed to the pan. Connected with the upper edges and at one end of the box 41 is an ordinary hopper 44, the sides of which are inwardly-inclined to the width of the box 41 to regulate the flow of the milled ores. Extending within an opening 45 in the upper edge of the hopper 41 is a slide 46 to cut off the supply of the milled ore to the conveyer 43. With the worm conveyer 43 is connected a shank 43$^a$, which extends beyond one end of the box 41, and upon said shank is a pulley 47. Upon the shaft 20 is a pulley 48. Over the pulley 48 and the pulley 47 extends an endless belt 49.

50 represents an ore-distributing plate, which is the proper width to extend within the sides 6 6 of the concentrating-pan 5. The upper end 51 of the plate 50 is curved in the arc of a circle inwardly and connected rigidly with the lower edge and forward end of the conveyer-box 41, the lower end of the plate inclining forwardly in the direction of the rear end 8 of the pan 5 and terminating a short distance therefrom. Within the curved inner surface of the upper end 51 of plate 50 is a water-supply pipe 52, which is perforated upon its under surface, the perforations extending the width of the plate 50, as seen in dotted lines in Fig. 1. The water is supplied to the pipe from any suitable source. Beneath the forward end of the pan 5 is a spout 53, supported by the standard 54, for carrying off the lighter material delivered from the pan.

Beneath the pocket 29 is a receptacle 55 for the metal.

I may employ a series of concentrating-pans 5 at short distances apart, the ore being conveyed through the box 41, as well as the water through the pipe 52, these agencies being shown so as to be continued an indefinite length.

In operation power is communicated to the line-shaft 20, thence to pan 5 and conveyer 43. The milled ore is supplied from the hopper 44 to the conveyer-box 41 and thence falls through the perforations 41ª upon the plate 50, the water from the pipe 52 irrigating the substances which fall from the lower end of the plate into the concentrating-pan 5. A quantity of metal is placed within the pocket to fill the same through opening 26. The power from the line-shaft 20 causes a reciprocating movement to be communicated from the eccentric-motor 25 25 to the pan 5, and during this movement the saturated ores are so agitated as to cause a separation of the light substances from the metal, the former moving rapidly and leaving the metal upon the surface of the bottom 7 of the pan, the metal moving slowly and gravitating upon the inclined surface toward the opening 26 to the metal-holding pocket. This pocket being nearly filled in the initial step, the metal which is now separated accumulates within the opening 26, while the lighter substances are washed over and pass off at the end of the pan into the trough 53. A rapid flow of the water and material may carry the metal slightly past the opening 26 upon the inclined surface 27, from whence in the shaking movement of the pan the metal and some water fall back within the said opening into the pocket. In the reciprocal movements of the pan the upper end of the valve-bar 32 comes into contact with the abutment 39 in a movement in its direction, and the valve is opened a sufficient distance to permit of a discharge of the metal into the box 55 below in such quantities as to make the contents of the pocket comparatively uniform, the adjustment of the rod 38 being such that the valve 33 may in the reciprocal movement of the pan open to a greater or less extent to permit of the regulated quantity of metal to be discharged through the valved opening 32 in proportion to the amount which may be obtained from the ores and accumulated at the said opening 26. The movement forward of the metals in the pan may also be accelerated by the change in inclination of the pan, the proper turning of the nuts 16 in the eyebolts 15 lowering the forward end of the pan in a sufficient degree.

The invention is applicable to the ordinary ore-washing pan, in which hand-power causes the shaking of the pan. The water may be conducted direct to the pan and the valve operated by hand or any suitable abutment.

It is obvious that a single opening and valve may be employed extending the width of the pocket instead of a number of valves and other equivalent devices for feeding the milled ore to the pan, as may be preferred.

Such modifications may be employed as are within the scope of the invention.

Having fully described my invention, what I now claim as new, and desire to secure by Letters Patent, is—

1. In a reciprocating ore-washing pan having a transverse opening in the bottom thereof, a pocket for the ore connected with the lower surface of the pan beneath said opening having sides and ends and a bottom inclined at an angle to one of said sides, and a discharge-opening near said inclined bottom a valve-operating pivoted lever on one of said sides having the said discharge-opening the upper end of which lever is bent forwardly at an angle to said side of the pocket a spring between the bent end of the lever and the side of said pocket and a stationary lever-contacting device extending in the direction of the upper end of said lever.

2. In an ore-separator, a reciprocating, inclined pan having sides and a rear end and a transverse opening in the bottom, and having a portion of the bottom of said pan on the forward side of said transverse opening deflected rearwardly and downwardly below the level of the bottom of said pan, oscillating devices for suspending said pan, a line-shaft, an eccentric on said shaft, an eccentric-rod connecting the eccentric with said pan, a pocket connected with the under side of the pan beneath the transverse opening in the bottom, having a valved discharge-opening, a pivoted valve-operating lever in the forward side of the pocket, a stationary bar in rear of said reciprocating pocket, and an adjustable rod on said bar against which end of the valve-lever comes into contact.

FRANCIS E. PARKER.

Witnesses:
FRANCIS A. LEACH,
THEODORE C. SPARKS.